Figure 1:
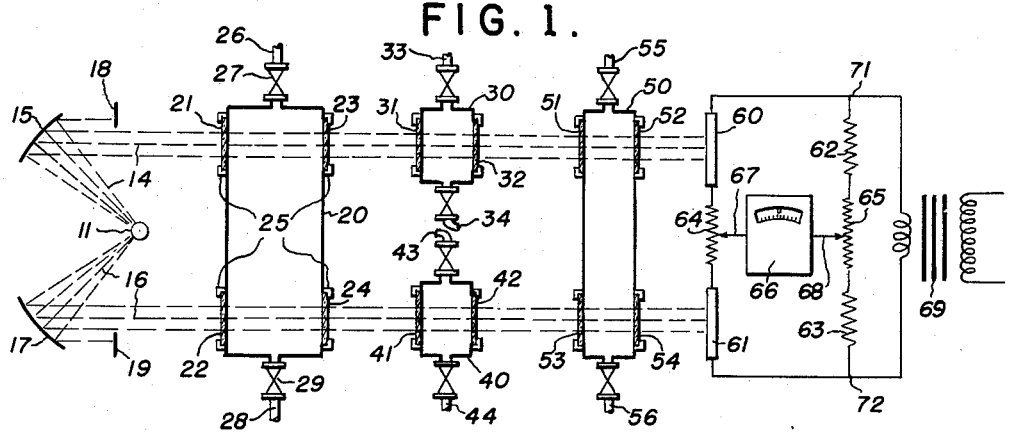

Oct. 25, 1955

D. D. FRIEL ET AL 2,721,942

INFRARED ANALYZER AND METHOD

Filed July 15, 1948

3 Sheets-Sheet 1

INVENTORS
DANIEL DENWOOD FRIEL and
RICHARD GAINES JACKSON
BY

Norris E. Ruckman

ATTORNEY

Oct. 25, 1955  D. D. FRIEL ET AL  2,721,942
INFRARED ANALYZER AND METHOD
Filed July 15, 1948  3 Sheets-Sheet 3

INVENTORS
DANIEL DENWOOD FRIEL and
RICHARD GAINES JACKSON
BY

ATTORNEY

United States Patent Office 2,721,942
Patented Oct. 25, 1955

2,721,942

INFRARED ANALYZER AND METHOD

Daniel Denwood Friel and Richard Gaines Jackson, Wilmington, Del., assignors to E. I. du Pont de Nemours & Company, Wilmington, Del., a corporation of Delaware Application July 15, 1948, Serial No. 38,906

10 Claims. (Cl. 250—43.5)

The present invention relates to methods and means for determining percentages of heteroatomic compounds in gas or liquid samples by measuring absorption of infrared radiation. More particularly the invention is concerned with infrared analyses for one or more components in fluid samples containing fluids which interfere with the determination by absorbing infrared radiation.

Heteroatomic compounds, i. e., compounds of more than one element as opposed to elemental compounds such as $O_2$, $N_2$ and $H_2$, exhibit selective absorption at characteristic frequencies in the infrared portion of the spectrum. A graph of the per cent of infrared radiation transmitted by a heteroatomic compound versus the wave length of radiation may be obtained with an infrared spectrophotometer, and is called a spectrogram. A spectrogram will show several bands of relatively high absorption which are directly related to the atomic masses, the atomic bonds and the molecular configuration in space of the compound, so no two different heteroatomic compounds will have exactly the same spectrogram. However, two compounds which have similarities in the above respects may have one or more similar absorption bands which coincide or partially overlap. Furthermore, the means breadth of each absorption band or, expressed differently, the number of wavelengths materially affected, increases as the amount of the compound in the path of the radiation is increased, which in turn increases the amount of overlap between absorption bands.

The magnitude of the absorption at each absorption band varies with the amount of compound in the path of the radiation in a manner which can be expressed mathematically by Beer's law in the form, $$\text{Fraction absorbed} = \frac{I_0 - I_1}{I_0} = 1 - e^{-kcx}$$

where
$I_0$ is the intensity of incident radiation of a given wavelength,
$I_1$ is the intensity of transmitted radiation of the given wavelength,
$e$ is the base of the natural system of logarithms = 2.718 . . . ,
$k$ is the absorption coefficient of the compound at the given wavelength,
$c$ is the concentration of the compound, and
$x$ is the thickness of the specimen in the path of the radiation.

It will be observed from the above equation that, as the amount of the compound in the path of the radiation ($cx$) is increased, the absorption at first increases rapidly but then increases less and less rapidly to approach the maximum value quite slowly.

The above properties have been known for many years and various attempts have been made to utilize them in analytical work. In the simplest case an infrared gas analyzer would include a source of infrared radiation, a single absorption chamber to contain the sample, and a single detector to measure the magnitude of radiation passing through the absorption chamber. Since the accuracy of such a single path analyzer depends heavily upon maintaining constancy of the radiation source, the ambient temperature, and the voltages used in the detector, this type of analyzer has little practical utility. A more accurate and stable analyzer is obtained by dividing the radiation from the infrared source into two paths, one passing through a sample chamber onto one detector and the other passing through a second similar chamber containing non-absorbing gas (to compensate for absorption by chamber windows) onto a second detector, the two detectors being arranged in a Wheatstone bridge circuit so that the difference between the magnitudes of radiation traversing the two paths is measured.

As both of the above analyzers would give a reading for any material exhibiting infrared absorption, they are not useful for determining an infrared-absorbing material in the presence of other infrared-absorbing material. Theoretically it should be possible to make the latter instrument selective for a particular gas in a mixture of infrared absorbing gases by employing infrared sources giving radiation of selected wavelengths, or by using optical filters which will transmit only the desire wavelengths. However, it is difficult to obtain satisfactory filters, and infrared sources supplying radiation of selected wavelengths are expensive, bulky, too fragile for many uses, and tend to lack sufficient stability and sensitivity for many applications.

The general principles of an instrument which avoids many of these difficulties are disclosed in Patent No. 1,758,088 issued to Hans Schmick. Such an instrument includes a source of infrared radiation supplying two parallel beams of infrared rays, a sample chamber adapted to contain a gas sample to be analyzed and located in the paths of both beams, a filter chamber containing a specimen of the infrared absorbing gas to be determined located in the path of one beam, a compensating chamber similar to the filter chamber but containing a non-absorbing gas such as air, the chamber being constructed of, or provided with windows of, a material transparent to the infrared radiation and providing for its passage through the chambers, and a bolometric resistance positioned in the path of each beam and connected into a Wheatstone bridge circuit adapted to measure differences in the energies of the two beams irradiating the resistances.

In this arrangement the filter chamber, containing an infrared absorbing gas A, will act as a very selective filter, absorbing radiation only at the characteristic wavelengths of that particular gas. When a sample containing gas A is placed in the sample chamber, the amount of radiation passing through the filter chamber will not be changed much by gas A, because the filter chamber has already accounted for most of the absorption which can be achieved with that gas. The compensating chamber has practically no absorbing action except that occurring at the chamber windows, and is provided because the proximity of the filter chamber to the bolometric resistance affects the temperature of the bolometer, which could produce a lack of symmetry that would disturb the measurement if the compensating chamber were not used. Therefore, the amount of radiation passing through the compensating chamber will be changed in accordance with the absorption by gas A in the sample chamber. The percentage of gas A in the sample can then be determined by comparing the measured energy difference between the two beams with a calibration against samples containing known percentages of gas A.

The above method is satisfactory only if the sample does not contain a gas having absorption bands which overlap those of the gas being determined in the wavelengths of the infrared beams. Unfortunately, it is often the case that samples to be analyzed do contain gases having such overlapping absorption bands and, to the extent that these gases absorb radiation in the same bands as the gas being determined, they cause erroneously high values in analyses. This occurs, for example, in attempting to determine a gas in the presence of homologs. Gases which have other features of similarity, such as ethane, ethylene and ethylene oxide, also cause difficulty because of overlapping absorption bands. It has been attempted to eliminate this interference effect by the use of an interference chamber containing specimens of the interfering gases, the chamber being located in front of the bolometric resistances and in the paths of both beams. If the interference chamber is made large enough, it is theoretically possible to absorb from both beams all but a negligible fraction of the radiation in the overlapping absorption bands, leaving only the non-interfering absorption bands of the gas being determined to affect the magnitude of radiation. However, this method has many practical disadvantages. The presence of large amounts of the interfering gases in the interference chamber frequently results in absorption of such a large proportion of radiation in wavelengths absorbed by the gas being determined that sensitivity for that gas is seriously reduced. Frequently it is not practical to provide an interference chamber which is large enough to contain sufficient of the interfering gases to eliminate interference. The use of an interference chamber is often undesirable because absorption of radiation at the windows required by this chamber decreases the sensitivity of the instrument by a factor of about 2.

Interference of the type discussed above is called positive interference because it causes erroneously high values in an analysis. A different kind of interference, called negative interference because it causes erroneously low values to be obtained, can result when the sample contains gases which absorb significant amounts of infrared radiation only in bands which do not appreciably overlap the absorption bands of the gas being determined, when the analyzer is operated at or near conditions of maximum stability. It has not been found practical to provide an infrared source of constant intensity and this will cause unstable operation unless the intensity of the two beams is balanced so that the total amount of energy irradiating each bolometric resistance is nearly the same. An increase or decrease in the intensity of the source will then affect each bolometric resistance by the same amount and will not affect the measured difference between the two beams at the bolometers. The intensities of the beams are balanced with the sample cell empty, but with the instrument otherwise in operating condition. The instrument is then said to be in optical balance. Since the gas in the filter cell absorbs a portion of the energy of the beam passing through, the energy of the beam passing through the sample cell to the filter chamber will then be greater than that of the beam passing through the sample chamber to the compensating chamber. Now when a heteroatomic gas, which absorbs at wavelengths other than those of the gas in the filter chamber, is placed in the sample chamber it will absorb a larger quantity of energy from the greater beam, although the percentage absorption for each beam will be the same. This interference effect will give erroneously low values in analyses unless the interfering gas also has equal or greater positive interference effects which offset this negative interference effect.

An analyzer of the Schmick type is not convenient for the determination of more than one component of a sample, since the contents of the filter chamber will have to be changed for each component to be determined. The analyzer would also have to be readjusted into optical balance in most cases. Frequently the contents of the interference chamber would also have to be changed. The only alternative would be to provide a different Schmick analyzer for each component to be determined. Although multi-component analyzers operating on entirely different principles have been designed, they have disadvantages in other respects. It is desirable to provide an analyzer operating on the Schmick principle, but overcoming interference difficulties, and adapted to analyze several components in rapid succession.

Accordingly it is among the objects of the present invention to provide improved methods and means for determining percentages of one or more heteroatomic compounds in fluid (gas or liquid) samples containing positively and/or negatively interfering fluids. It is a further object of the invention to provide a method for substantially eliminating positive interference with only slight reduction in the sensitivity of the analyzer for the fluid to be determined, and without the necessity of using an interference chamber. A further object of the invention is to provide a method for substantially eliminating negative interference when using the analyzer at or near optical balance. A still further object of the invention is to provide an analyzer which operates on the principle of measuring the difference between the energies of two beams from a source of infrared radiation after one of the beams has passed through a chamber containing the fluid sample being analyzed and through a filter device in which a specimen of a component being determined functions as a filter, and the other beam has passed through the sample chamber and a compensating device, and which is adapted to determine in succession the percentages of two or more components of fluid samples containing interfering gases or liquids easily and accurately without changing the contents of the chambers. Other objects of the invention will become apparent from the specification and claims.

In general the above objects of the invention are accomplished by passing two beams of infrared radiation from a suitable source through a sample chamber containing a fluid (gas or liquid) sample to be analyzed, passing one beam through a filter device containing the component or components to be determined and specimens of each type of negatively interfering fluid, passing the other beam through a compensating cell containing specimens of each type of positively interfering fluid, and measuring the difference in energy between the two beams with two bolometric resistances arranged in a Wheatstone bridge circuit or equivalent detectors. The relative amounts of the specimens in the paths of the radiation may be adjusted, in a manner to be described subsequently, so that the presence of interfering fluids in the sample chamber has a negligible effect on the measured energy difference between the two beams for the range of concentrations encountered in the sample.

Although a specimen of the interfering fluid itself will normally be used to correct for the interference, it is also possible to use other materials in the manner described above to correct for interference. The material used must have at least one absorption band which overlaps an absorption band of the interfering fluid, which band does not overlap an absorption band of the heteroatomic compound to be determined. Preferably, in the case of positive interference, the material has no absorption bands in common with the compound to be determined. Materials fulfilling the above conditions can often be determined without difficulty by studying the absorption curves of various materials, a large number of such curves being available in the literature.

For multicomponent analysis the filter device has separate compartments, arranged in parallel, for each component to be determined, and enough additional compartments to accommodate specimens of such other types of fluids as cause negative interference in the determinations. Each chamber may contain a pure specimen or an appropriate mixture. The compensating device is likewise divided into separate compartments, arranged in parallel, to accommodate specimens of each type of positively interfering fluid in the sample. Provision is made to direct the proper amount of radiation through each chamber to substantially eliminate interference with the fluid being determined. Following determination of the first component the amount of radiation directed through the chambers is readjusted to provide optimum conditions for determination of the next component. Control of the radiation can be accomplished readily by the use of shields provided with sets of apertures of the proper size and location to transmit the desired amount of radiation through each chamber. A shield can be changed quickly fo determination of the next component. Obviously other means, such as shields with adjustable apertures, may be used to give the proper distribution of radiation through the chambers.

Only a small amount of an interfering fluid need be placed in the path of the proper beam to markedly reduce interference by that fluid but, for substantially complete elimination of interference, there is an optimum amount of the fluid which should be carefully determined. The optimum amount of an interfering gas to interpose in the path of the beam is not predictable by any practical method. However, it is not difficult to determine the proper amount by trial and error. The first step is to determine the amount of interference by filling the sample chamber with a mixture of the interfering fluid and a non-absorbing fluid, the concentration of the interfering fluid in the mixture being within the range expected in the samples to be determined, and noting the resulting instrument deflection. From this determination the amount of the interfering fluid required for correction is estimated and placed in the proper chamber to correct for the deflection. If the instrument deflection is not thereby reduced to zero the amount of correcting fluid should be increased. If the deflection changes from positive to negative (or from negative to positive) an overcorrection has been made and the amount of correcting fluid should be reduced.

When there is more than one positive or negative interfering fluid, it is usually best to determine the relative amounts of interference caused by all of these fluids before any correction is made. This determination will give an indication of the relative amount of each interfering fluid required for correction. When two fluids are of the same type as to chemical structure and the amount of interference caused, it is often sufficient to use one of the two to correct for both. For example, if ethane and propane cause about the same amount of interference with determinations of another gas, as might be expected from their close similarity, it will usually be sufficient to use ethane alone for correction.

An interference chamber intercepting both beams can be used in addition to the compensating chamber to reduce interference. For multicomponent analyses an interference device may be used which is divided into several compartments for different fluids or mixtures of fluids, as in the case of the filter and compensating devices. The usual procedure is to determine which fluid or fluids cause the greatest amount of interference with the interfence chamber empty, and then to place a specimen of the fluid or fluids in the interference chamber. Any remaining interference caused by the fluid or fluids and interference caused by other fluids is then determined. The proportions of these interfering fluids to place in the compensating device may then be determined as indicated above.

It should be understood that the order in which the various chambers are arranged in the path of a beam is immaterial, e. g., the filter chamber can precede or follow the sample cell. Likewise the shields used in multicomponent analysis can be located anywhere along the path of a beam, either preceding or following the filter or compensating devices.

It should be understood that correction for a positively interfering gas or liquid may be made by using the proper concentration of the interfering fluid in a mixture of fluids in a single compartment compensating device; or by placing the interfering fluid in a separate compartment of the proper dimensions arranged in series with the other compartment or compartments of the compensating device, so that the entire beam passes through that compartment; or by placing the interfering gas in a compartment arranged in parallel with the rest of the compensating device, and passing the proper proportion of the radiation of the beam through that compartment. Various combinations of the above may also be used. For example, in multicomponent analysis, it may be desirable to use a multicompartment compensating device in which each compartment contains a different mixture of interfering fluids and a different compartment is used during the determination of each component. The same considerations apply to correcting for a negatively interfering fluid by placing a specimen in the path of the beam passing through the filter device. It should be understood that liquids are susceptible of analysis by infrared radiation in substantially the same manner as gas samples, and the term "fluid" is intended to cover both gas and liquid analyses.

Figure 2:
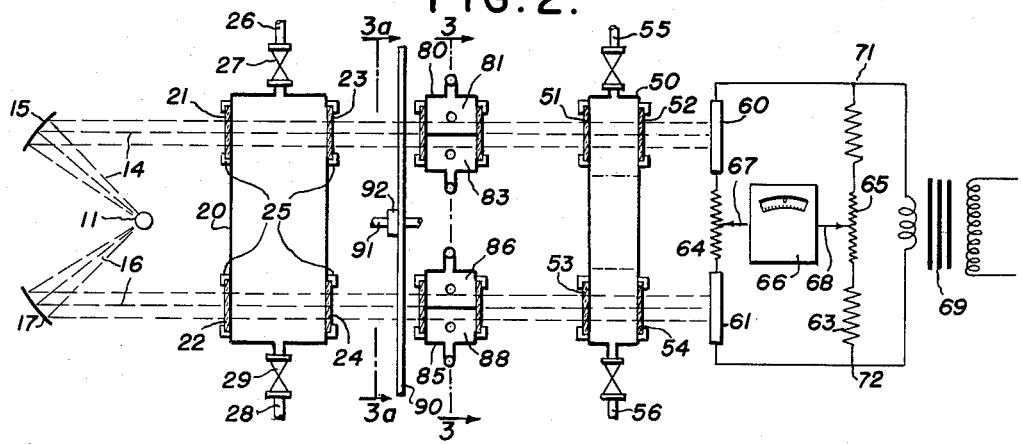
Figure 3A:
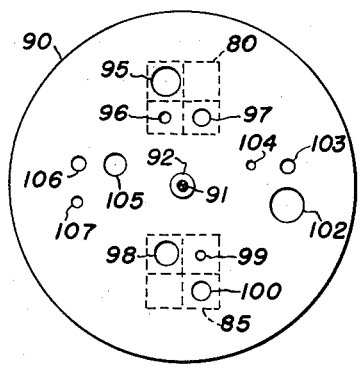
Figure 3:
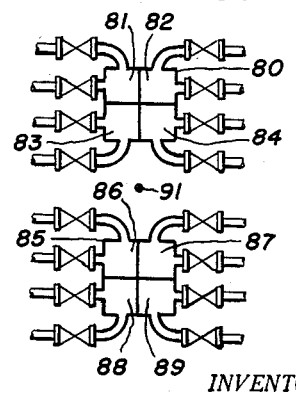
Figure 4:
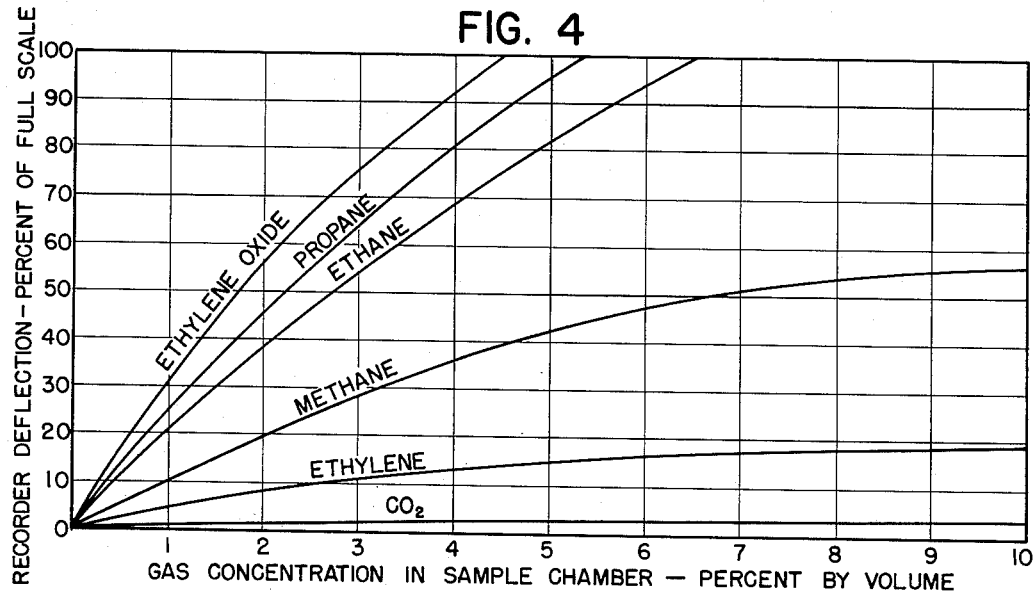
Figure 5:
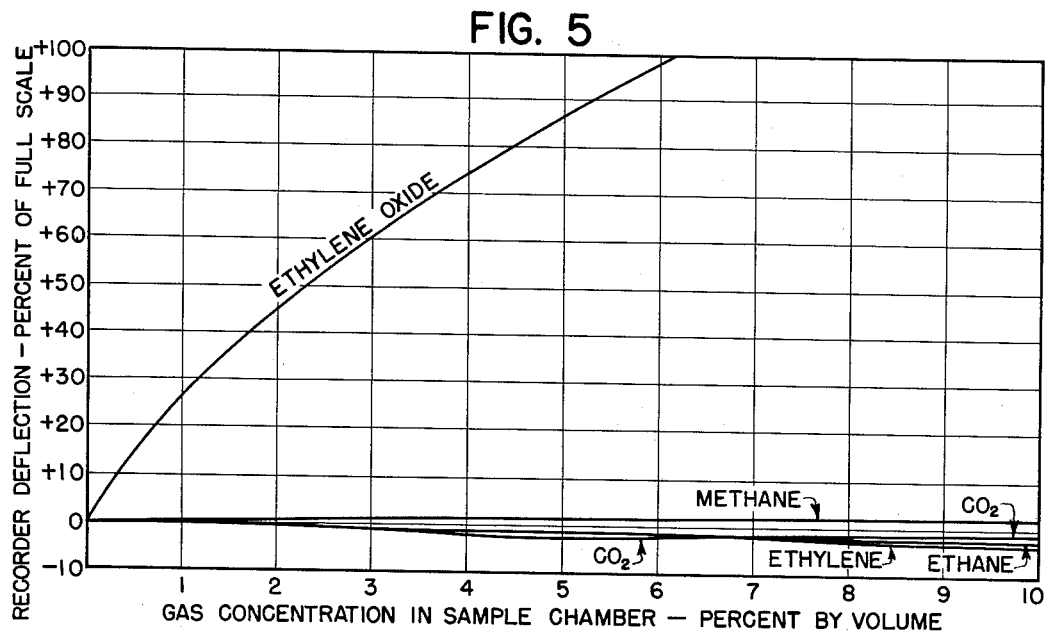
Figure 6:
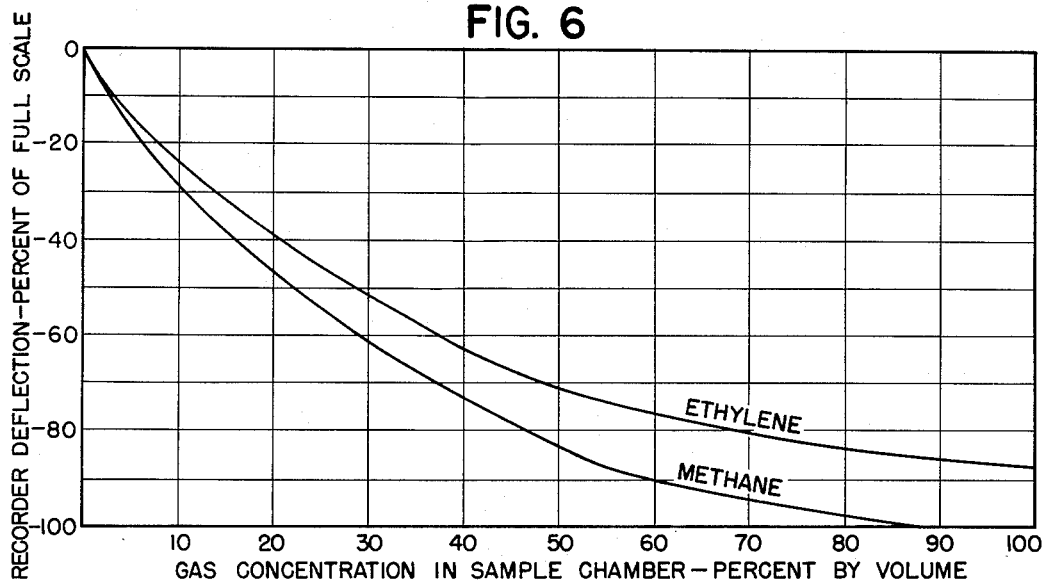
Figure 7:
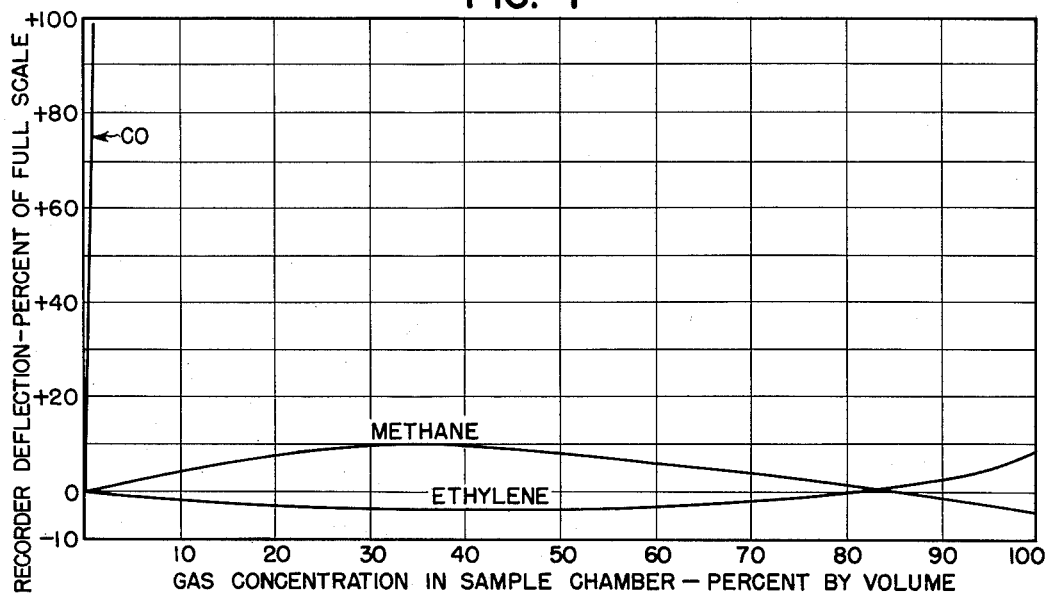

The invention will now be described in detail in connection with the drawings, in which Fig. 1 is a diagrammatic section through an analyzing instrument for determining single components of gas samples, Fig. 2 is a modification of the instrument shown in Fig. 1 to adapt it for multicomponent analyses, Fig. 3 is a sectional view of a portion of the instrument shown in Fig. 2, taken along the line 3—3 of Fig. 2, Fig. 3a is a sectional view of a portion of the instrument shown in Fig. 2, taken along the line 3a—3a of Fig. 2, Fig. 4 is a graph of absorption curves showing positive interference encountered in analyzing for ethylene oxde in the presence of propane, ethane, methane, ethylene and carbon dioxide, Fig. 5 is a corresponding graph showing the reduction of positive interference obtained by placing the proper mixture of interfering gases in the compensating device, Fig. 6 is a graph of absorption curves showing negative interference encountered in analyzing for carbon monoxide in the presence of methane and ethylene, and Fig. 7 is a corresponding graph showing the reduction of negative interference obtained by placing the proper mixture of gases in the filter device.

Referring to Fig. 1, a source of infrared radiation is indicated at 11. This may be any conventional source of infrared radiation, a hot-body or a gaseous discharge tube, emitting radiation over the infrared range of the spectrum. A beam of radiation 14 is reflected by concave mirror 15 of suitable curvature to focus the beam. A second beam of radiation 16 is reflected in a path parallel to beam 14 by mirror 17, which is also suitably curved to focus the beam. An adjustable beam trimmer 18 is arranged to intercept a portion of beam 14 to regulate the total amount of energy of this beam, and a similar beam trimmer 19 is provided to regulate the energy of beam 16.

The two beams pass from the mirrors to a gas-tight sample chamber 20 arranged with the front and back faces at right-angles to the paths of the beams. The front face is provided with windows 21 and 22 of suitable infrared transparent material, such as silver chloride or calcium fluoride, which admit the radiation into the chamber. The back face of the chamber is similarly provided with infrared transparent windows 23 and 24 through which the beams pass out of the chamber. These windows are held in place by gas-tight frames designated by 25. Instead of using frames the windows can be cemented in place. The chamber is also provided with a pipe 26, which may be closed by valve 27, and a second pipe 28, located on the opposite side of the chamber which may be closed by valve 29. In filling the chamber with a gas sample, both valves are opened and the sample is flowed into the chamber through one pipe and out of the chamber through the other pipe until the chamber is flushed free of gas previously present in the chamber. The two valves may then be closed when intermittent analyses are to be made, or the sample may be flowed through the chamber continuously when a continuous recording of gas composition is to be made. The dimensions of the chamber should be such that the amount of absorption of radiation by the sample will give sufficient sensitivity for the desired accuracy, about 45 mm. thickness in the direction of radiation travel usually being suitable for determining gas concentrations of about 0.1% to 100%.

After passing through the sample chamber and the gas sample contained therein, beam 14 passes to a gastight filter chamber, entering this chamber through an infrared transparent window 31 and leaving the chamber through a similar window 32. In the filter chamber is placed a specimen of the component to be determined, valved pipes 33 and 34, connected with opposite sides of the chamber, being used for that purpose. The gas specimen acts as a selective filter, absorbing infrared radiation in the wavelengths of the absorption bands characteristic of that gas, and not absorbing radiation of other wavelengths to any appreciable extent. The chamber is preferably made of such dimensions that the beam 14 will pass through a sufficient thickness of gas to filter out a major portion of the radiation absorbable by that gas, about 25 mm. usually being a suitable thickness. This chamber is also used for correcting for negative interference, as will be described subsequently.

The other beam 16 passes in a similar manner through a compensating chamber 40. This chamber is preferably identical in construction and dimensions to the filter chamber 30. Like chamber 30 it is provided with infrared transparent windows 41 and 42, providing for passage of the beam into and out of the chamber, and valved pipes 43 and 44 for introducing gas into the chamber. When the sample to be analyzed does not contain gases which cause positive interference, chamber 40 is filled with a non-absorbing gas such as nitrogen or air freed of $CO_2$ and water vapor. The chamber then serves merely to balance absorption occurring at the windows of the filter chamber. But when the sample contains positively interfering gases the compensating chamber is filled with a mixture of gases which will absorb the proper amounts of interfering rays to correct for the interference.

Both beams 14 and 16 now pass to and through an interference chamber 50, when it is desired to use an interference chamber. As has been mentioned previously, the use of an interference chamber is optional when the compensating chamber is used to correct for positive interference, but will be described because it is sometimes helpful in correcting for or minimizing interference. The interference chamber is generally like the sample chamber and is also positioned in the paths of both beams with the face at right angles to their paths. The interference chamber is provided with windows 51 and 52 of infrared transparent material, providing for passage of beam 14 into and out of the chamber, and similar windows 53 and 54 providing for passage of beam 16 into and out of the chamber. The chamber is also provided with valved pipes 55 and 56, located on opposite sides of the chamber, for introducing gas specimens.

From the interference chamber the two beams are focused by the mirrors 15 and 17 onto infrared radiation detectors adapted to measure the difference between the energies of the two beams. A bolometer, a device for measuring radiant energy by means of changes produced in electrical conductivity of a resistance by the radiation, has been found satisfactory for this purpose. A material having a high temperature coefficient of change in electrical conductivity should be used for the bolometric resistance in order to have high sensitivity. Platinum and nickel are commonly used as bolometric resistances. A bolometric resistance 60 is arranged to be irradiated by beam 14, and a second bolometric resistance 61 is arranged to be irradiated by beam 16. Other infrared radiation detectors, such as thermocouples, thermistors, photoconducting and photoelectric cells, can be used instead of bolometers. Gas cell detectors can also be used under certain conditions.

The bolometric resistances are connected in series with two standard resistances 62 and 63 to complete a Wheatstone bridge. Two trimmer resistors are also provided in the circuit for balancing the bridge, resistor 64 being located between the bolometers 60 and 61 and resistor 65 being located between resistances 62 and 63. A potentiometer 66 for indicating lack of balance in the bridge circuit is connected across the bridge to the resistors 64 and 65 through variable contacts 67 and 68. The voltage for this bridge is supplied by a transformer 69 connected to a suitable source of power. The transformer is connected to the bridge at points 71 and 72 where the bolometers 60 and 61 are connected to the resistances 62 and 63, respectively. This is believed to be the most stable arrangement for the bridge circuit since the bolometers have the same current flowing through them at all times. In the simplest case the potentiometer 66 may be manually operated and utilize a sensitive A. C. voltmeter for indicating any difference in potential between the variable contacts 67 and 68. For greater utility the potentiometer may be a null-indicating potentiometer recorder comprising an amplifier and recorder, arranged to automatically adjust variable contact 68 as necessary to balance the bridge circuit and record the amount of adjustment made. Such instruments are commercially available and form no part of the present invention. When using the latter instrument variable contact 67 may be manually controlled to bring the bridge circuit into electrical balance with the sample chamber 20 empty, prior to determining a component in a sample.

When a sample is placed in the sample chamber, the component being determined will reduce the energy of beam 16 irradiating the bolometric resistance 61 more than it will the energy of beam 14 irradiating the bolometric resistance 60, since the latter beam has already been affected by the specimen of the component in the filter chamber 30. This will cause an unequal change in resistance values and produce an unbalance in the bridge circuit. The amount of unbalance is a direct function of the concentration of the component being determined in the sample, unless there is uncorrected interference by other gases. This function can be determined by calibrating the analyzer with known samples and preparing a graph of concentration of the component versus instrument reading.

The analyzing instrument described is intended for determining only one component of gas (or liquid) samples. Also, for routine analytical work, e. g., plant control work, it is desirable to set the instrument for the determination of a particular compound so that only the contents of the sample chamber is changed thereafter. The instrument shown in Figs. 2 and 3 is adapted for rapid multicomponent analysis of a single sample, or for determining different compounds in samples of widely different compositions by simple adjustment. Equivalent flexibility of operation would require several instruments of the type disclosed in connection with Fig. 1. The general arrangement of the instrument shown in Fig. 2 is similar to that of Fig. 1, and like parts are given the same numbers. Instead of the single filter chamber 30 of Fig. 1, a filter device 80 is provided which comprises four chambers 81, 82, 83 and 84 arranged as shown in Fig. 3 so that a different portion of the beam 14 can be passed through each chamber. In a similar way, instead of compensating chamber 40 of Fig. 1, a compensating device 85 is provided which comprises four chambers 86, 87, 88 and 89 arranged so that a different portion of the beam 16 can be passed through each chamber. A specimen of the first component to be determined is placed in chamber 81, a specimen of the second gas to be determined is placed in chamber 82, a negatively interfering gas is placed in chamber 83, and a second negatively interfering gas is placed in chamber 84. Of course, one of the negatively interfering gases in the determination of one component may also be a component to be determined. In a similar way a non-absorbing gas and three positively interfering gases are placed in separate chambers 86 to 89.

A shield 90, of a material which is opaque to infrared radiation, is located after the sample chamber 20 and before the filter and compensating devices so as to intercept the two beams 14 and 16. The shield 90 is supported by an axle 91 passing through a bearing 92 attached to the shield, so that the shield may be rotated to bring different portions into the paths of the beams. The shield is provided with holes of such size and so located that the proper amount of radiation is passed through the chambers of the filter and compensating devices to correct for interference. A typical arrangement of apertures is shown in Fig. 3a. Aperture 95 is positioned over chamber 81 and is of large size to cut off little of the radiation from this chamber. On the other hand, only a relatively small amount of radiation is allowed to pass through chambers 83 and 84 by apertures 96 and 97, respectively, and no radiation is allowed to pass through chamber 82 of the filter device. Radiation is passed through only three of the chambers of the compensating device by apertures 98 to 100, since the gas placed in chamber 88 is only required for correcting interference with the second component. The apertures are of different sizes to proportion the radiation in order to provide the proper amount of correction for positive interference. The sizes of apertures 98 to 100 should also be in the proper proportion to apertures 95 to 97 to provide optical balance between the beams reaching the bolometric resistances.

After determination of the first component, the shield 90 is rotated 90° in a counterclockwise direction to bring a new set of holes into position over the chambers. A large aperture 102 will then be positioned over chamber 82 containing a specimen of the second component to be determined, a smaller aperture 103 will be positioned over chamber 81, since the first component causes negative interference with the second component, a small aperture 104 will be positioned over chamber 83, since this specimen causes negative interference with the second component as well as the first, and no radiation will be admitted to chamber 84. Three apertures 105, 106 and 107, will then be positioned over chambers 86, 88 and 89 of the compensating cell, no radiation being admitted to chamber 87 in this position, since the gas contained therein is only required for correcting interference during determination of the first component.

A specific example of how to correct for positive interference will now be given. The problem is to analyze for concentrations of about 0.5% to about 5% of ethylene oxide in the presence of similar concentrations of ethylene, propane, ethane, methane, and carbon dioxide. The filter chamber of the analyzer described in connection with Fig. 1 was filled with 100% ethylene oxide, the compensating and interference chambers were filled with nitrogen, the relative energies of the two infrared beams were adjusted to give optical balance, and the bolometer-recorder circuit was adjusted to give a full scale reading at about 5% concentration of ethyleneoxide. An attempt to correct for the interference by filling the interference chamber with 100% ethylene then produced the result shown in Fig. 4. The curve for each gas was obtained by filling the sample chamber with various concentrations of the gas in nitrogen. It will be observed that a 50% recorder deflection was obtained by about 1.8% ethylene oxide, 2.3% propane, 2.8% ethane, 6.8% methane, or a mixture of 4% methane and 4% ethylene. Obviously it is impossible, under these conditions, to determine ethylene oxide in a sample containing one or more of the other gases.

This seemingly hopeless condition can be corrected by placing the proper amounts of interfering gases in the compensating chamber. It was desirable to obtain this correction with as few gases as possible. Since the gases methane, ethane, and propane are homologs, it was expected that possibly just one or two of these gases could be used to correct for all three. Since ethylene contains a double bond which is not found in any of the above homologs it is reasonable to expect that some of that gas will also have to be placed in the compensation cell. Various mixtures were tried. In this manner it was found that a mixture of 12% ethane, 27% methane, 26% ethylene and 35% air will substantially eliminate interference when the instrument is in optical balance. The resultant curves for the interfering gases are shown in Fig. 5. It is astonishing that this result is accomplished with almost no effect on the ethylene oxide curve. A 50% recorder deflection obtained with an unknown sample determines that 2.3% of ethylene oxide is present regardless of the concentrations of ethylene, propane, ethane, methane and carbon dioxide present in the sample, at least up to the maximum of 10% of any one interfering gas shown in Fig. 5.

Similar reduction in interference may be realized by different arrangements of the interfering gases in the interference and compensating chambers. For example, 100% ethane in the interference chamber, and 25% ethane, 45% methane, 8% ethylene and 22% air in the compensating chamber substantially eliminates interference. In this latter case the optical balance was adjusted until carbon dioxide gave negligible deflection instead of putting carbon dioxide in the compensating chamber.

In the above examples, for each specimen of an interfering gas used to correct for interference, correction may be accomplished in a similar manner with another fluid which fulfills the requirements of having at least one absorption band which overlaps an absorption band of the interfering gas and which does not overlap an absorption band of the component to be determined. The procedure has been described for the use of a mixture of gases in a single chamber compensating device as shown in Fig. 1. The procedure is similar for the multichamber modification described in connection with Fig. 2 except that the sizes of the apertures in the shield are varied to find the condition giving minimum interference. The same reduction in interference can be obtained in this way as is obtained by passing all of the radiation of the beam through a single chamber compensating device containing the optimum concentration of each gas, since in each case control of the desired spectral distribution of the energy in the beam is achieved by regulating the number of molecules of each gas which are in the path of radiation. Thus, for the problem of analysis discussed in connection with Fig. 4, approximately the same reduction in interference as that shown in Fig. 5 would be obtained under the same conditions and maintaining the same total energy to the bolometer except that the single chamber compensating device is replaced with a four-chamber compensating device having the same thickness in the direction of radiation travel and containing specimens of ethane, methane, ethylene and air in separate chambers, and provided with a shield intercepting the radiation and having apertures of the following locations and relative areas: ethane chamber, 12; methane chamber, 27; ethylene chamber, 26; and air chamber, 35.

As an illustration of correction for negative interference, assume that it is desired to accurately analyze for small amounts of carbon monoxide in the presence of ethylene and methane. With 100% carbon monoxide in the filter chamber and 100% methane in the interference chamber, and with the analyzer brought into optical balance, the presence of methane or ethylene in the sample chamber gives negative deflections as shown in Fig. 6.

It is not possible to reduce this interference sufficiently by altering the optical balance. The interference was reduced to values which are negligible for most compositions by changing the contents of the filter chamber from 100% carbon monoxide to 17% methane, 1.3% ethylene and 81.7% carbon monoxide, as shown in Fig. 7.

Fig. 7 shows that it is not always possible to reduce interference to negligible amounts for all of the concentrations of the interfering gas which may be encountered in a sample. Methane concentrations of 20% to 60% caused positive recorder deflections of the order of 10% of full scale under the conditions of operation. The methane interference curve drops to zero recorder deflection at about 85% concentration. This zero point could be moved to a lower concentration by using slightly less methane in the filter chamber, but the amount of negative recorder deflection would then be increased at higher concentrations. A compromise must be selected which is most advantageous for the samples to be analyzed. It is because of this type of difficulty that it is sometimes desirable to place specimens of an interfering fluid in the paths of both of the radiant beams passing to the bolometers. Thus, in the present example, an interference chamber containing methane was used to flatten the methane interference curve, which would otherwise have been curved to a serious extent.

Instead of using an interference chamber, the same result can be obtained by adding an amount of interfering fluid to both the compensating chamber and the filter chamber which will cause the two beams to pass through the same number of molecules of the fluid as would be the case if an interference cell were used. In the present example this would involve increasing the size of the filter chamber or the pressure in it to accommodate the increased amount of methane. The total amount of methane in the filter chamber would then exceed the amount of methane in the compensating chamber by the same numerical amount as if the interference chamber were used. Similar considerations would apply in eliminating the use of an interference chamber in the example discussed in connection with Figs. 4 and 5, the ethylene content of the compensating and filter chambers being increased by an amount equivalent to the amount of ethylene interposed in the paths of the beams by the interference chamber.

It is apparent from the above examples that placing interfering gas in the path of one of the infrared beams, in accordance with the present invention, is much more effective in reducing interference than placing the interfering gas in an interference cell intercepting both beams. This result is highly unexpected, and it is all the more surprising that positive and negative interference can be substantially eliminated without appreciable decrease in the sensitivity of the analyzer for the gas to be determined. By the present invention, method and means for analysis are provided by which interference may be substantially eliminated during analyses of gas samples containing gases which normally cause serious interference with the determination; and a multicomponent analyzer is provided adapted to use that method for the ready, quick and accurate determination of successive components in gas samples.

As many apparently widely different embodiments of this invention may be made without departing from the spirit and scope thereof, it is to be understood that the invention is not limited to the specific illustrations thereof except as defined in the appended claims.

What is claimed is:

1. The method for determining the percentage of a fluid heteroatomic compound in a sample containing interfering fluids which comprises passing two optically balanced beams of infrared radiation from a source of radiation through the sample to be analyzed, passing only one of the beams through specimens of the heteroatomic compound, which is present in an amount sufficient to filter from the beam most of the radiation in the absorption bands characteristic of the compound, and of a material having at least one absorption band which overlaps an absorption band of a negatively interfering fluid present in the sample, the material being present in an amount which substantially reduces interference by the negatively interfering fluid, passing the other beam through a material having at least one absorption band which overlaps an absorption band of a positively interfering fluid present in the sample and which does not overlap an absorption band of the heteroatomic compound, the material being present in an amount which substantially reduces interference by the positively interfering fluid, measuring the difference between the overall radiant energies of the two beams after passage through the sample and specimens, and determining the percentage of heteroatomic compound by comparing the measured energy difference with a calibration against samples containing known percentages of the heteroatomic compound.

2. The method for determining the percentage of a fluid heteroatomic compound in a sample containing interfering fluids which comprises passing two optically balanced beams of infrared radiation from a source of radiation through the sample to be analyzed, passing only one of the beams through specimens of the heteroatomic compound, which is present in an amount sufficient to filter from the beam most of the radiation in the absorption bands characteristic of the compound, and of a negatively interfering fluid present in the sample, the latter specimen being present in an amount which substantially reduces interference by the negatively interfering fluid, passing the other beam through a specimen of a positively interfering fluid present in the sample, the specimen being present in an amount which substantially reduces interference by the positively interfering fluid, measuring the difference between the overall radiant energies of the two beams after passage through the sample and specimens, and determining the percentage of heteroatomic compound by comparing the measured energy difference with a calibration against samples containing known percentages of the heteroatomic compound.

3. The method for determining a percentage of a fluid heteroatomic compound in a sample containing a negatively interfering fluid, which comprises conducting a beam from a source of infrared radiation through a sample chamber and a specimen of the heteroatomic compound, conducting a second beam from the source of infrared radiation through the sample chamber, measuring the difference between the overall radiant energies of the two beams, balancing the energies of the two beams until the energy difference is substantially negligible, determining interference energy differences produced by the presence of various concentrations of the negatively interfering fluid in the sample chamber, reducing interference by introducing a specimen of the interfering fluid into the path of the first of said beams in the case of negative interference and into the path of the second beam in the case of positive interference, rebalancing the energies of the two beams until the energy difference is again substantially negligible, redetermining the interference energy difference produced by the presence of the interfering fluid in the sample chamber and adjusting the amount of specimen in the path of the beam until the presence of the interfering gas in the sample chamber has a negligible effect on the energy difference for the range of concentrations encountered in the sample, introducing the sample containing the unknown percentage of heteroatomic compound into the sample chamber, and determining the percentage of heteroatomic compound present by comparing the measured energy difference with a calibration against samples containing known percentages of the heteroatomic compound.

4. The method for determining the percentage of a fluid heteroatomic compound in a sample containing a negatively interfering fluid, which comprises conducting a beam from a source of infrared radiation through a sample chamber and a filter device containing a specimen of the heteroatomic compound and a smaller amount of the negatively interfering fluid, conducting a second beam from the source of infrared radiation through the sample chamber, measuring the difference between the energies of the two beams, balancing the overall radiant energies of the two beams so that the energy difference is substantially negligible, determining interference energy differences produced by the presence of the interfering fluid in the sample chamber, and reducing interference by adjusting the amount of interfering fluid in the filter device until the interference is substantially negligible for the range of concentrations of interfering fluid encountered in the gas sample, introducing the sample containing the unknown percentage of heteroatomic compound into the sample chamber, and determining the percentage of heteroatomic compound present by comparing the measured energy difference with a calibration against samples containing known percentages of the heteroatomic compound.

5. The method for determining the percentages of more than one heteroatomic compound in a sample containing interfering fluids, including at least one negatively interfering fluid, which comprises conducting a beam from a source of infrared radiation through a sample chamber and through specimens of each heteratomic compound and of each type of negatively interfering fluid arranged so that a different portion of the beam passes through each specimen, conducting a second beam from the source of infrared radiation through the sample chamber and a specimen of each type of positively interfering fluid arranged so that a different portion of the beam passes through each specimen, measuring the difference between the total energies of the two beams after passage through the specimens, balancing the energies of the two beams so that the energy difference is substantially negligible, adjusting the relative energies of the portions of the beams passing through the specimens so that the measured difference between the total energies of the two beams is substantially unaffected by the presence in the sample chamber of fluids interfering with the determination of the first compound to be determined for the range of concentrations encountered in the sample, introducing the sample containing the unknown percentages of heteroatomic compounds into the sample cell and determining the percentage of the first compound in the sample by comparing the measured difference between the total energies of the two beams with a calibration against samples containing known percentages of the first compound, readjusting the relative energies of the portions of the beams passing through the specimens so that the measured difference between the total energies of the two beams is substantially unaffected by the presence in the sample chamber of fluids interfering with the determination of the second compound to be determined for the range of concentrations encountered in the gas sample, and determining the percentage of the second compound in the sample by comparing the measured difference between the total energies of the two beams with a calibration against samples containing known percentages of the second compound.

6. In an analyzer for determining the percentage of a fluid heteroatomic compound in samples containing a negatively interfering fluid and which comprises a source of infrared radiation, means for directing two beams from said source through substantially parallel paths, beam trimmers for balancing the relative energies of the two beams, a sample chamber adapted to contain a fluid sample to be analyzed located in the paths of both beams, a filter chamber containing a specimen of the fluid to be determined located in the path of only one beam, a compensating chamber located in the path of the other beam, an interference chamber containing a specimen of an interfering fluid located in the paths of both beams, said chambers being provided with windows providing for passage of the beams through the chambers, and measuring means adapted to measure differences between the total energies of the two beams after passage through said chambers, the improvement for reducing negative interference when operating with the two beams in optical balance of providing interference reducing means in the filter chamber comprising a material having at least one absorption band which overlaps an absorption band of the negatively interfering fluid, the amount of said material being such that the total amount of radiant energy absorbed in said band from the beam passing through said filter chamber is substantially greater than the total amount of radiant energy absorbed from the other beam in said band.

7. An analyzer for determining the percentages of fluid heteroatomic components in samples containing interfering fluids which comprises a source of infrared radiation, means for directing two beams from said source through substantially parallel paths, a sample chamber adapted to contain a fluid sample to be analyzed located in the paths of both beams, a filter device divided into several chambers adapted to contain a specimen of component to be determined and of each negatively interfering fluids located in the path of one beam and arranged so that a different portion of the radiation of the beam may be passed through each chamber, a compensating device divided into several chambers adapted to contain specimens of positively interfering fluids and non-absorbing fluids located in the path of the other beam and arranged so that a different portion of the radiation of this beam may be passed through each chamber, said chambers having windows providing for passage of the radiation through the chambers, measuring means adapted to measure differences between the total energies of the two beams after passage through said chambers, and radiation proportioning means positioned in the path of each of said beams and adapted to regulate the relative amounts of radiation passing through each chamber to said measuring means.

8. An analyzer for determining the percentages of fluid heteroatomic components in samples containing interfering fluids which comprises a source of infrared radiation, means for directing two beams from said source through substantially parallel paths, a sample chamber adapted to contain a fluid sample to be analyzed located in the paths of both beams, a filter device divided into several chambers adapted to contain a specimen of component to be determined and of each negatively interfering fluids located in the path of one beam and arranged so that a different portion of the radiation of the beam may be passed through each chamber, a compensating device divided into several chambers adapted to contain specimens of positively interfering fluids and non-absorbing fluids located in the path of the other beam and arranged so that a different portion of the radiation of this beam may be passed through each chamber, an interference device divided into several chambers adapted to contain specimens of interfering fluids and arranged so that a different portion of the radiation of the beams may be passed through each chamber, said chambers having windows providing for passage of the radiation through the chambers, measuring means adapted to measure differences between the total energies of the beams after passage through said chambers, and radiation proportioning means positioned in the path of each of said beams and adapted to regulate the relative amounts of radiation passing through each chamber to said measuring means.

9. An analyzer as in claim 7 in which said radiation proportioning means comprises a shield positioned in the path of each of said beams and provided with holes correlated in size and location with the use of particular compositions in the chambers of said filter and compensating devices to provide sensitivity for components to be determined together with substantial freedom from interference by the interfering fluids.

10. An analyzer as in claim 7 in which said radiation proportioning means comprises a rotatable shield positioned in the paths of both of said beams and provided with a set of holes for each component to be determined, each set being correlated as to size and location with the use of particular compositions in the chambers of said filter and compensating devices to provide sensitivity for a particular component together with substantial freedom from interference by the interfering fluids, the relative positions of the sets of holes being such that the shield is adapted to be successively rotated into the proper position for determination of each component to be determined.

References Cited in the file of this patent

UNITED STATES PATENTS

| | | |
|---|---|---|
| 1,695,031 | Schmick | Dec. 11, 1928 |
| 1,758,088 | Schmick | May 13, 1930 |
| 2,212,211 | Pfund | Aug. 20, 1940 |
| 2,386,831 | Wright | Oct. 16, 1945 |
| 2,431,019 | Barnes | Nov. 18, 1947 |
| 2,443,427 | Kidder et al. | June 15, 1948 |
| 2,452,122 | Gumaer | Oct. 26, 1948 |
| 2,462,995 | Ritzmann | Mar. 1, 1949 |
| 2,518,307 | Groebe | Aug. 8, 1950 |

OTHER REFERENCES

Recording Infra-Red Analyzers for Butadiene and Styrene Plant Streams, by N. Wright et al., Journal of the Optical Society of America, April 1946, pages 195–202.

Selective Infra-Red Gas Analyzers by W. G. Fastie et al., Journal of the Optical Society of America, October 1947, pages 762–768.

An Optical-Acoustic Method of Gas Analysis, by F. J. Gallisen, Nature, February 1, 1947, page 167.

Infra-Red Instrumentation and Techniques, by V. Z. Williams, Review of Scientific Instruments, March 1948, pages 135, 176–178.